United States Patent [19]

Sobieniak

[11] Patent Number: 4,730,410
[45] Date of Patent: Mar. 15, 1988

[54] SPINNING LURE

[76] Inventor: Mathew G. Sobieniak, 76 Onondaga St., Lewiston, N.Y. 14092

[21] Appl. No.: 20,863

[22] Filed: Mar. 2, 1987

Related U.S. Application Data

[63] Continuation of Ser. No. 838,800, Mar. 12, 1986, abandoned.

[51] Int. Cl.$^4$ .............................................. A01K 85/00
[52] U.S. Cl. .................................. 43/42.19; 43/42.17
[58] Field of Search ............... 43/42.19, 42.2, 42.21, 43/42.15, 42.17, 42.12, 42.45, 42.46, 42.47

[56] References Cited

U.S. PATENT DOCUMENTS

| | | | |
|---|---|---|---|
| 1,771,587 | 7/1930 | Shogren | 43/42.17 |
| 2,429,568 | 10/1947 | Stevermer | 43/42.17 |
| 2,708,805 | 5/1955 | Garvie | 43/42.15 |
| 3,221,436 | 12/1965 | Mikus | 43/42.17 |
| 3,397,478 | 8/1968 | Lowes | 43/42.17 |
| 3,406,478 | 10/1968 | Hudson | 43/42.2 |
| 4,110,930 | 9/1978 | Daniels | 43/42.17 |
| 4,616,440 | 10/1986 | Millroy | 43/42.12 |

FOREIGN PATENT DOCUMENTS 1294840  4/1962  France ................................ 43/42.2

Primary Examiner—Kurt Rowan
Attorney, Agent, or Firm—Donald C. Studley

[57] ABSTRACT

The present invention relates to an artificial spinning lure which has a non-streamlined contour along its leading face. The contour provides the lure with an induced and controlled drag which is sufficient to substantially completely overcome the torque created by a spoon, or spinner blade, as the lure is drawn through the water. The present lure is comprised of a spindle which has a spinner blade rotatably attached thereto and a resistance body mounted on the spindle and spacedly positioned from the spinner blade. The resistance body has a non-streamline, drag producing front face which produces a drag when the lure is being pulled through the water that is sufficient to substantially entirely overcome the torque produced by the rotation of the spinner blade.

6 Claims, 2 Drawing Figures

SPINNING LURE

This is a continuation of Ser. No. 838,800, filed 3/12/86, now abandoned.

BACKGROUND OF THE INVENTION

The present invention relates to an improved spinning lures useful in trolling or casting. The present lures are particularly useful in methods of fishing which involve the lure being submerged and in motion relative to the water.

The prior art lures designed for trolling or casting are streamlined, that is, the shape of the body of the lure is contoured to reduce resistance, or drag, as the lure moves through the water. Previously it was considered that a streamline shape to reduce drag was desirable and positive attribute of spinning lures. Typical streamlined lures are described and illustrated in U.S. Pat. Nos. 1,395,533; 2,551,127; 2,763,953; 3,340,643, and; 4,163,338.

The types of lures to which the present invention relates are those that have spinner blades, or spoons. A spinner blade is a blade or plate rotatably attached to the spindle portion of the lure. The purpose of the spinner blade is to attract fish by rotational movement of the blade about the axis of the spindle. As the lure is moved through the water, the spinner blade acts as a rotating vane. A forward moving spinner moves through the water in a spiral path. Spinner blades are varied in size, or shape to change the angle at which the blade rotates about the spindle. Typically spinner blades are eliptical in shape and are usually hollowed. Spinner blades are commonly made having shinny surfaces to be more attractive to the fish. Typically such blades are fabricated of a gilded metal or stainless steel. Spinner blades, or spoons, are commercially available in a number of standard sizes, for example, from 00 (small) to 5 (large).

The motion of the spinner blade through the water causes, by friction of the blade and because it is attached to the spindle of the lure, a torque, or twisting movement, on the spindle. The twisting movement is directly transferred to the fish line. Much of the twisting movement will transcend a swivel, or swivels, positioned between the fish line and the lure because the forward motion of the lure through the water substantially reduces the ability of a swivel to rotate. As the trolling or casting operation proceeds, the fishing line is repeatedly rotated over long periods of time. The result is a severely twisted line which self-forms into loops, larger twists and snarls that soon become practically impossible to untangle. The ultimate solution is to replace the entire fish line.

In summary, the more streamlined the spinner blade lure; the more twisting of the fish line; the more twisting of the line; and; the sooner the line becomes useless.

The lures of the present invention substantially eliminate line twist. Further, the present lures provide a maximum of spinner blade rotation with a minimum of forward motion.

SUMMARY OF THE INVENTION

The present invention provides an artificial spinning lure, the body of which has a non-streamlined contour along the leading face. The present invention provides a lure having an induced and controlled drag. The drag that is generated by the present lure is sufficient to substantially completely overcome, the torque created by the spoon, or spinner blade, as it is drawn through the water.

The present lure is comprised of spindle which has a spinner blade rotatably attached thereto. A resistance body is mounted on the spindle spacedly positioned from the spinner blade by one or more bushings or spacers. The resistance body has a resistance or drag producing front face. The resistance face produces a drag on the entire lure which is sufficient to substantially entirely overcome the torque produced by the rotation of the spinner blade when the lure is being used. The present lures, as do the prior art lures, have a fish hook or plurality of fish hooks attached to the rear, or aft, end of the lure.

DETAILED DESCRIPTION OF THE INVENTION

The present lure will be more fully understood by reference to the following description and the accompanying drawings in which.

Figure 1:
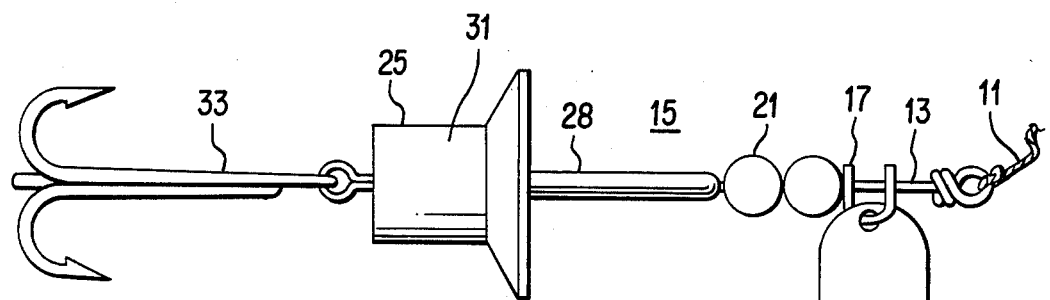
FIG. 1 is a elevationa view of the present lure.

Looking now in detail at FIG. 1, fishing line 11 is attached to the forward portion of spindle 13 of the lure, which is generally denoted as 15. The forward portion of the lure is the portion attached to the line nearest the fishing pole. Spindle 13 is suitably fabricated of metallic rod or wire, e.g., stainless steel. Spinner 19 is rotatably mounted on spindle 13. As shown in the drawing, typical mounting is by means of a clevis, or stirrup, such as, 17. Spinner blade 19 is spacedly positioned from resistance body 25, which is securely attached to spindle 13. The spaced relationship of spinner blade 19 and resistance body 25, is suitably maintained by one or more bushings, or washers, such as, 21, or by spacers, such as 28. Suitably such spacing means are rotably mounted on spindle 13. The main purposes of the spacers are to maintain spinner blade 19 in a spaced relation to resistance body 25 and to enable proper rotation of spinner blade 19.

Resistance body 25 has a non-streamlined, resistance face 27 in the portion closest to spinner blade 19. Resistance face 27 preferably radially extends outward from resistance body 25 having a flare, such as, 29. The flared portion of resistance body 25 provides a means of increasing the drag without an increase, or proportional increase, in the weight of the resistance body. This aspect allows materials of various weights to be used as the resistance body. Resistance face 27 has a non-streamlined, drag creating surface. The resistance face may be flat, but more preferably is hollowed, or dished, by removal of a portion of the face. More preferably, the indentation in the resistance face is tapered or curved inward to present a regular, and desirably, smooth, surface to spinner blade 19. Such embodiments provide an increased drag that is smoother acting in the water.

As shown in the drawings, and in a preferred embodiment, body 25 is cylindrical and resistance face 27 has a concave surface. Typically the concave surface tapers inward at an angle of between about 15 and about 45 degrees, and more preferably between about 25 and about 35 degrees. Although in cross-section resistance body 25 is preferably circular, it may have other shapes, for example, square, oval, or polysided. As a practical matter to facilitate manufacture and also to eliminate sharp edges and prevent snagging when the lure is being used, a cylindrical shape is eminently useful for the resistance body.

Also as shown in the FIG. 1 resistance body 25 preferably has an elongated portion 31 to lend additional stability and weight along the aft, or rear, portion of the lure as the lure passes through the water. Attached to the aft portion of the lure, suitably to spindle 13, is a fish hook, or hooks, such as, 33. Various types of fish hooks or lure arrangements may be used, for example, various ormanentations, baits or luring materials may be attached. The purpose of hook portion 33 is to catch a fish.

The weight of the present lure typically ranges from about ⅛ to about ½ ounce.

Figure 2:
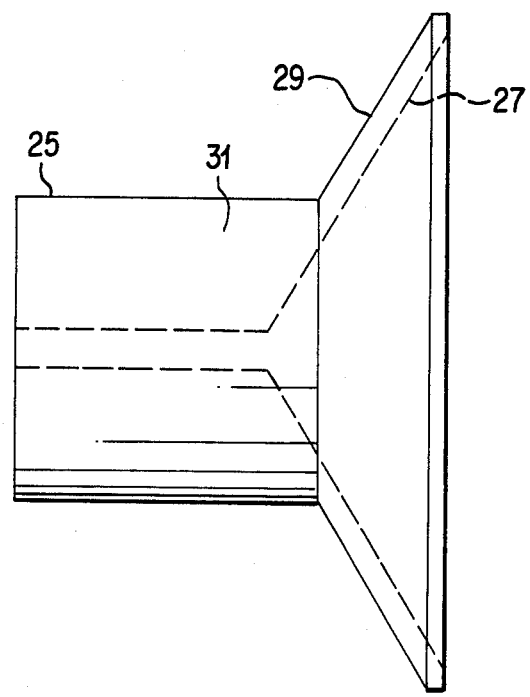
FIG. 2 is a elevational view showing the resistance face of the present lure in detail.

FIG. 2 shows the resistance face 27 in greater detail. In this view resistance body 25 has a resistance face 27 suitably formed by removing a conical portion from the front face of resistance body 25. This embodiment has been found particularly useful when the resistance body is fabricated of an easily drillable metal, such as brass, or copper. In such instances the surface area of the resistance face may be easily adjusted by regulating the depth of drilling using a single drilling tool. In a preferred embodiment, the angle of the portion removed to supply resistance face 27, corresponds to the angle of flange 29.

In use it has been found that the relation of the operative surface area of the spinner blade 19, which produces the torque, and the surface area of the present resistance face, which substantially entirely eliminates the torque, preferably ranges between about 8:1 and about 2:1, and most preferably, for maximum rotational movement of the spinner blade with the elimination, or substantial elimination, of torque a range between about 6:1 and about 4:1 has been found most useful. The operative surface area of the spinner blade is defined as the area of a single planar face of the blade.

It will be apparent that many widely different embodiments of the invention may be made without departing from the spirit and scope thereof; and therefore the present invention is not intended to be limited except as recited in the following claims.

What is claimed is:

1. An artifical spinning lure comprising:
   a. a spinle having a hook mounted thereon,
   b. a spinner blade rotatably attached to said spindle,
   c. an elongated resistance body securedly attached in a stationary manner on said spindle, and spacedly positioned between said hook and said spinner blade by a spacing means rotatably attached to said spindle,
   d. said resistance body having a front portion and an aft portion, said resistance body being elongated and having a substantially uniform cross-section, and,
   e. a stationary, concave resistance face positioned on said front portion of said resistance body, said resistance face being concave toward said spinner blade, said resistance face presented a substantially entirely exposed, non-streamlined, drag-producing surface, said drag-producing surface being sufficient to produce a drag sufficient to substantially entirely overcome the torque produced by the rotation of said spinner blade and to substantially eliminate line twist when the lure is in use.

2. The lure of claim 1 wherein a fish hook attached to the aft portion of said lure.

3. The lure of claim 1 wherein said resistance face is formed by removal of a portion of the face of said resistance body.

4. The lure of claim 1 whrein the concave face tapers inward at an angle between about 20 and about 45 degrees.

5. The lure of claim 1 wherein the ratio of the operative surface area of the spinner blade to the surface area of said resistance face is between about 8:1 and about 2:1.

6. The lure of claim 1 wherein the ratio of the operative surface area of the spinner blade to the surface area of said resistance face is between about 6:1 and about 4:1.

* * * * *